3,369,407
DOSING SPOON
Gary L. Hein, Decatur, Ill., assignor to Lincoln Laboratories Inc., Decatur, Ill., a corporation of Indiana
Filed Apr. 2, 1965, Ser. No. 445,195
5 Claims. (Cl. 73—427)

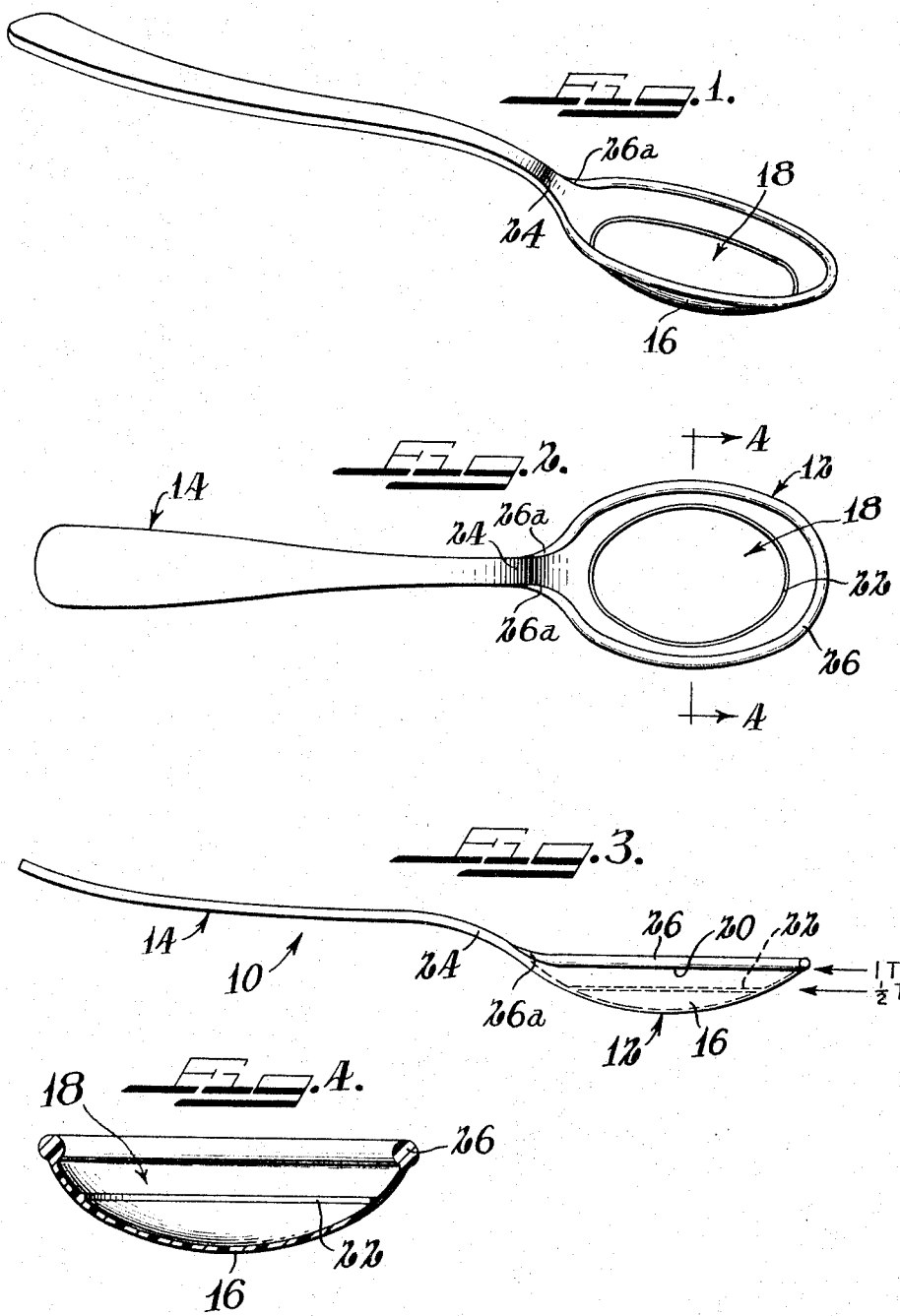

ABSTRACT OF THE DISCLOSURE

An inexpensive dosing spoon is provided for accurate administering of a liquid dose of a therapeutic without spillage. The spoon is provided with measuring indicia molded into the bowl portion. Spillage is prevented by means including a handle connecting to the upper edge of the bowl portion and a smooth, rounded bead provided along the remainder of the edge of the bowl portion and in part projecting inwardly of the bowl. The bead provides reinforcement for the thin plastic bowl and for the juncture between the bowl and handle.

---

The present invention relates to a spoon and more particularly to a dosing spoon to be used for administering an accurate dosage of a therapeutic liquid.

The use of teaspoons in administering liquid therapeutic agents such as antibiotics is well known. It has been known that proper administration of certain therapeutic agents requires very accurate measurement of the dosage. The use of ordinary teaspoons fails to provide an accurate enough standard for measurement, since volume varies considerably between teaspoons, depending upon design and make. Thus, others have heretofore suggested the concept of a dosing spoon where indicia is marked on the material-containing depression, or bowl portion, of the spoon to assist in attaining a correct dosage of the liquid therapeutic being administered.

A second, and perhaps more important deficiency of ordinary teaspoons is that a teaspoon when fully filled is a difficult instrument to manipulate in such a manner as to prevent spillage therefrom. With regular teaspoons, part of a dosage may be spilled enroute from the bottle of medicament to the mouth. When one is dealing with only 5 cc., the normal volume of a teaspoon, the loss of only 1 cc. through drippage or spillage constitutes loss of a substantial portion of the intended dosage. This loss could be very critical in regard to therapeutic response, particularly where antibiotics are involved.

Thus, one object of this invention is to provide an improved dosing spoon which will afford both improved means for precise measurement of the liquid dosage to be administered by the spoon and will also prevent inadvertent spillage, or drippage, of the liquid therefrom.

Another object of this invention is to provide an improved dosing spoon that is characterized by its simplicity and inexpensiveness of construction.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

FIG. 1 is a perspective view of a dosing spoon embodying my invention;

FIG. 2 is a top plan view of the dosing spoon of FIG. 1;

FIG. 3 is a side elevational view of the spoon of FIG. 2; and

FIG. 4 is an enlarged cross-section view taken through the bowl portion of the spoon and substantially on line 4—4 of FIG. 2.

Referring now to the drawing, there is shown in the figures a spoon generally indicated at 10 which provides a material-receiving depression, or bowl portion, generally indicated at 12, and a handle generally indicated at 14. The bowl portion 12 is defined by a concaved or dished wall 16 that opens upwardly and which generally encloses and surrounds a liquid-receiving depression or space 18. The wall 16 of bowl portion 12 is provided with a plurality of dosage indicia thereon. In the preferred form, a first indicia line, or level, 20 provided on the bowl portion of the spoon located substantially at the juncture between the bowl portion and the rounded bead indicates the level of a full teaspoon, while a second indicia line, or level mark, 22 indicates the ½ teaspoon capacity of space 18.

In the improved spoon herein disclosed, means are provided, adjacent the upper peripheral edge of the upwardly opening bowl portion 12, to prevent spillage or dripping of liquid from the spoon after the liquid has been poured into the bowl portion 12. These means, in the preferred form as shown in the drawing, includes the connecting portion 24 of handle 14 which connects to, or merges with, the dished wall 16 of the bowl 12, and the provision of an enlarged, smoothly rounded, bead 26 which is defined adjacent and along the remaining portion of the upper periphery of bowl portion 12.

It will be understood that, it is possible to provide a spoon where the handle does not merge with, or continue smoothly into, the upper peripheral wall portion of the bowl portion of the spoon. In such a construction (not shown), the bead 26 will be provided so as to extend completely around the entire upper peripheral edge of the bowl portion of the spoon. However, in the preferred form illustrated, since the connecting portion 24 of the handle provides a partial barrier to spillage at the point where the handle merges with the upper peripheral edges of wall 16 of the spoon, it is necessary that the bead 26 extend only along the remaining portion of the periphery of the bowl. In order to provide a smooth and continuous edge construction along all portions of the spoon that are adapted to enter the mouth, the bead 26 is extended, as at 26a, up along the lateral edges of the connecting portion 24 of handle 14, and the bead 26a gradually decreases in size until it blends or merges into the lateral edges of the handle 14.

The rounded bead 26 is shaped generally circular in cross-section as best seen in FIG. 4, although it may also take a more flattened form that is generally, of ovate cross-section. In any event, it is important that a portion of the bead 26 project inwardly relative to the wall 16, as can best be seen in FIG. 4, so as to project inwardly of the liquid-receiving space 18. Preferably, the full-teaspoon marking, or indicia, 20 is located precisely, or nearly precisely, along the juncture of the bead 26 with the wall 16 of the bowl portion 12. When the liquid being administered has a hue or is tinted, and is placed in the space 18 of bowl portion 12 up to the indicia mark 20, the contact, or adjacency, of the upper surface of the liquid with the overlying portion of rounded bead 26 will cooperate with the refraction of light through bead 26 to provide an easy visual reference to the fact that the spoon is filled to the indicia adjacent the bead 26. Preferably, the wall 16 and bead 26 are provided in transparent or translucent material, so that filling to the proper level or indicia may be easily observed. The indicia lines, or level marks, 20 and 22 may be defined on wall 16 in any manner, such as by a scoring line or by a projecting rib defined on wall 16 as actually shown in FIG. 4, or my imprinting or etching the indicia on the wall.

In the preferred form the spoon 10 is of unitary construction and is molded from a synthetic plastic material such as an acrylic, polyethylene, or polystyrene, which may be tinted to any desired color, for aesthetics or other reason, although preferably the color of the bead should be selected so as not to interfere with the optical purposes of the bead 26 as disclosed hereinabove.

When the spoon 10 is molded, the wall 16 is of rather thin cross-section, as seen in FIG. 4, but the bead 26 then serves additionally as a rigidifying and reinforcement means both for the dished wall 16 of bowl portion 12 and at the connection region between bowl portion 12 and handle 14. Further, in some articles formed of plastic, there is a tendency of edges of such articles, when defined by two intersecting planes, to be rough. The provision of the rounded bead 26, 26a along the edges of those portions of the spoon which enter the mouth, obviates the problem.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States is:

1. A dosing spoon comprising an upwardly opening dished bowl portion, a handle for said bowl portion, and means along the entire peripheral edge of said dished bowl portion for limiting spillage of liquid from the said bowl portion of the spoon, said means including the handle connecting to the bowl portion adjacent a portion of the upper peripheral edge of the bowl, and a rounded bead provided along the remainder of the periphery of the bowl portion of the spoon.

2. A dosing spoon comprising an upwardly opening dished bowl portion, a handle for said bowl portion, indicia on said bowl portion designating a plurality of dosages for administration by said spoon, and means along the entire peripheral edge of said dished bowl portion for limiting spillage of liquid from the said bowl portion of the spoon, said means including a rounded bead provided along at least a portion of said peripheral edge of the spoon, and one of the indicia provided on the bowl portion of the spoon located substantially at the juncture between the bowl portion and said rounded bead.

3. A dosing spoon as in claim 1 wherein a portion of said rounded bead projects inwardly of the space defined by the bowl portion of the spoon.

4. A dosing spoon as in claim 1 wherein said rounded head projects inwardly of the space defined by said bowl portion, and said bead continuing along a portion of the edge of the handle and merging thereinto to provide a smooth edge along all portions of the spoon adapted to enter the mouth.

5. A dosing spoon as in claim 2 wherein the spoon and bead are integrally molded from a synthetic plastic material.

References Cited

UNITED STATES PATENTS

| | | | |
|---|---|---|---|
| 353,055 | 11/1886 | Dorr | 73—427 |
| 2,069,089 | 1/1937 | Goldman et al. | 220—90.2 |
| 2,165,045 | 7/1939 | Garside | 73—426 |
| 2,603,093 | 7/1952 | Cordova | 73—427 |
| 2,824,369 | 2/1958 | Welsh | 30—324 |
| 3,166,005 | 1/1965 | Jepson | 73—427 X |

FOREIGN PATENTS 24,619  11/1906  Great Britain.

LOUIS R. PRINCE, *Primary Examiner.*

D. M. YASICH, *Assistant Examiner.*